Sept. 25, 1962
R. Y. HEISLER ETAL
3,055,934
PREPARATION OF ESTERS FROM TERTIARY OLEFINS
Filed April 30, 1959
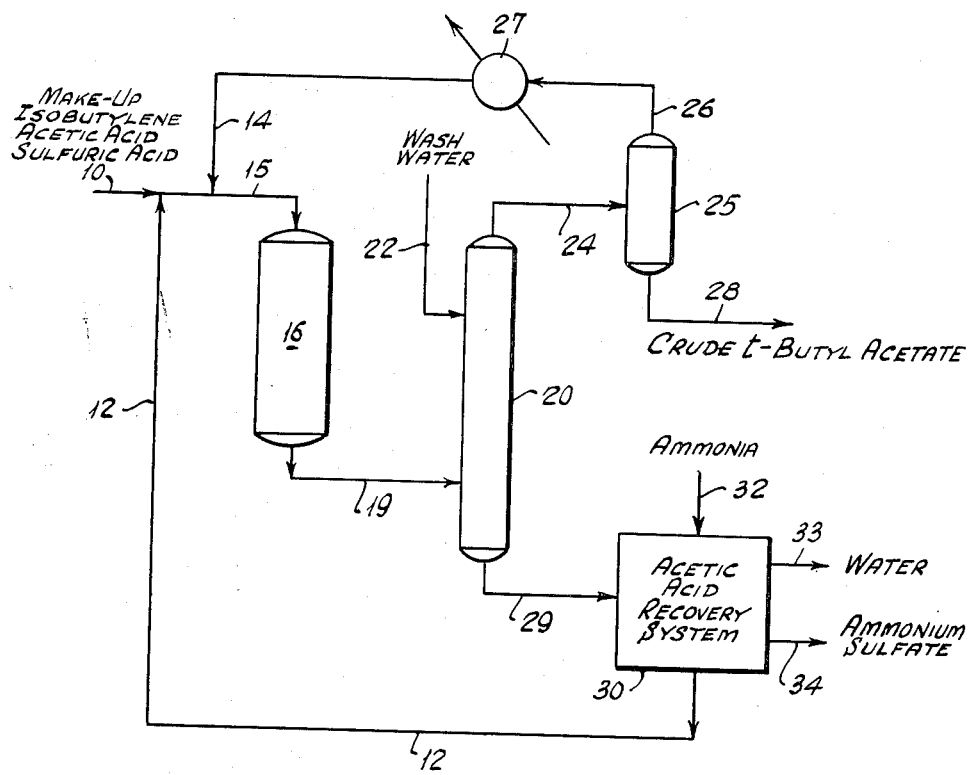

United States Patent Office 3,055,934
Patented Sept. 25, 1962

3,055,934
PREPARATION OF ESTERS FROM TERTIARY OLEFINS
Robert Y. Heisler, Fishkill, Howard V. Hess, Glenham, George W. Eckert, Wappingers Falls, and Louis E. Ruidisch, Fishkill, N.Y., assignors to Texaco Inc., a corporation of Delaware
Filed Apr. 30, 1959, Ser. No. 810,039
7 Claims. (Cl. 260—497)

The instant invention relates to a process for the preparation of carboxylic esters of tertiary alcohols, and more particularly to such process where a "tertiary base" or, more simply put, a "tertiary" olefin compound of 4 to 5 carbon atoms is reacted in an esterification zone with an aliphatic carboxylic acid having 2 to 3 carbon atoms in a liquid phase reaction mixture using sulfuric acid catalysis.

Using, for example, acetic acid and isobutylene, the reaction can be depicted as follows:

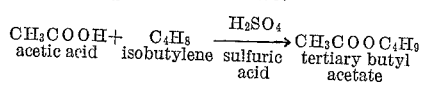

Such ester is useful as a paint solvent, as a grease component, and as a valuable additive for improving the octane rating of high quality leaded gasolines. As a group, the tertiary alkyl esters formed from the $C_{4-5}$ tertiary base olefins and $C_{2-3}$ aliphatic carboxylic acids are good solvents for many organic materials, thus useful as vehicles therefor.

Heretofore the condensation of a tertiary olefin compound with a carboxylic acid in the presence of sulfuric acid or other strong acid has been regarded as a comparatively difficult operation to perform without making a substantial proportion of olefin polymers. Frequently in the past it has been elected therefore to polymerize deliberately the tertiary base olefins in a hydrocarbon stream, to remove the resulting polymers, and then to form secondary alkyl esters of carboxylic acids with olefins remaining in the so-treated stream.

When, however, it was desired to form esters of the tertiary base olefins such as isobutylene, the sulfuric acid catalyst concentration in the reaction mixture was reduced to a comparatively low value, e.g. 5 weight percent of the reaction mixture, and the temperature was maintained not above 30° C. (86° F.)—and usually substantially lower—whereby some polymerization of the olefin might be averted at the expense of establishing a very sluggish reaction rate.

The separation of the resulting tertiary ester from the crude reaction product also has posed significant problems because the tertiary ester is substantially less stable than corresponding esters made from normal olefins. The mere distillation or other heating of the tertiary ester in the presence of a minor amount of a strong mineral acid such as sulfuric acid, or even a prolonged heating of the tertiary ester in the presence of a lower carboxylic acid (such as acetic acid which is a typical component of a crude withdrawn reaction mixture from making tertiary butyl acetate because the reaction cannot be expected to go to completion) is sufficient to decompose a substantial amount or all of the tertiary base olefin and the free carboxylic acid.

In the past it has been proposed to recover esters from carboxylic acid-olefin reaction mixtures by flashing off the comparatively low boiling unreacted olefin hydrocarbon and thereafter washing out free acids from the remaining liquid phase reaction mixture with water. In such process large amounts of water are necessary to provide a comparatively acid-free raw ester product for finishing. Additionally, a good deal of ester is carried away in the aqueous acid layer (extract solution), and the very dilution of that layer makes recovery of product values and unreacted raw materials an expensive job.

An advantage of our process over conventional processes for the manufacture of tertiary alkyl esters from carboxylic acids and lower iso-olefins lies in the fact that our process achieves the effective suppression of the olefin polymerization reaction while operating at a temperature sufficiently high to give a reasonably fast rate of formation of the ester, and said temperature is readily and simply maintained. A further advantage of our process over conventional treatments is the fact that it can be operated continuously with comparative ease because of the rapid reaction rate obtained and because of the simplicity of maintaining the union of required reaction conditions.

A further and very distinct advantage of our process over conventional treatment is the ridding of the crude withdrawn reaction mixture of free acid effectively and cheaply with a comparatively small amount of wash water to give an aqueous extract phase which contains materials in an economically recoverable condition and an ester-containing raffinate phase which can be worked up without risk of substantial decomposition of the tertiary ester.

Broadly, our process comprises: forming a homogeneous liquid phase reaction mixture containing about 0.5–2.5 weight percent of sulfuric acid and 1.5–2.5 mols of said tertiary olefin per mol of carboxylic acid, continuously passing said reaction mixture into a reaction zone, maintaining temperature of said reaction mixture in said reaction zone between 95° and 160° F., maintaining pressure in said reaction zone sufficiently high for holding the reaction mixture in the liquid phase, maintaining average residence time of said reaction mixture in said reaction zone between about 15 and about 120 minutes, continuously withdrawing crude liquid phase reaction product containing the tertiary ester from said reaction zone, extracting with liquid water in an extraction zone sulfuric acid and free carboxylic acid from said crude liquid phase reaction product, separating resulting ester-olefin liquid raffinate phase containing tertiary alkyl ester product from resulting carboxylic acid-rich aqueous liquid extract phase, recovering carboxylic acid from said extract phase, and separating tertiary olefin from said raffinate phase containing the tertiary alkyl ester of said carboxylic acid.

The drawing is a flow diagram showing one way our process can be practiced for making tertiary butyl acetate from isobutylene and acetic acid.

In place of isobutylene one can use isopentene, that is, 2-methyl-1-butene. Higher olefins than this are not readily amenable to our process because of their lower reaction rate and or their excessively high boiling point for ready evaporative separation from the raffinate phase in process. In place of acetic acid, propionic acid can be substituted. Use of higher aliphatic carboxylic acids is unwarranted in our process because of their increased solubility in organic liquid such as the product acetate or unreacted olefinic hydrocarbon. The acid is preferably virtually or completely anhydrous to prevent formation of significant amounts of tertiary alcohol in process.

Preferably, for the greatest product output in given-sized equipment and for economy of raw materials, the product is tertiary butyl acetate, and the isobutylene supplied to the process is substantially pure isobutylene, e.g. 90% isobutylene or higher. However, if desired, the useful olefins, instead of being pure, can be mixed with each other or mixed with unreactive or substantially less reactive materials. Thus, for example, we can use pure isobutylene made by cracking isobutylene dimer. On the other hand, we can use a $C_4$ and/or a $C_5$ cut from a catalytic or a thermal cracking operation. Such cut ordinarily will contain somewhat less than 20% of the tertiary olefin and the balance of diluent hydrocarbons. A typical so-called "B—B" stream from catalytic cracking can contain 10–25 mol percent isobutylene, 50 mol percent paraffins, and the balance preponderantly butene-1 and cis- and trans-butene-2. A suitable stream for making our tertiary alkyl ester contains, then, from 10 to 100 mol percent iso-olefin and, preferably from 90–100 mol percent isobutylene.

The mol ratio of tertiary olefin to carboxylic acid in our process is maintained broadly between about 1.5:1 and 2.5:1. The excess olefin helps to drive the reaction towards completion and assistants in the effective separation of acids from the ester. Substantially lower mol ratios than the foregoing are less advantageous in these respects, and higher ones entail not only more recovery processing but also an increased risk of olefin polymerization in process. Preferably the mol ratio, particularly when reacting isobutylene with acetic acid, is about 2 mols of olefin per mol of carboxylic acid.

Using a sulfuric acid concentration substantially above about 2½ weight percent of the reaction mixture greatly increases the risk of olefin polymer formation, as will be shown hereinafter. We have found it especially advantageous to maintain an upper limit of about 2 weight percent of sulfuric acid in the reaction mixture. Concentrations substantially below about ½ weight percent sulfuric acid require longer holding times than are desirable for obtaining substantial conversion of the reactants into the ester product. At the sulfuric acid dosage and the mol ratio of reactants we use the reaction mixture is a completely homogeneous liquid phase under pressure sufficient to prevent olefin vaporization.

Once the reaction mixture is so made little or no agitation need be used to maintain it in good condition for the reaction. Accordingly, the reaction apparatus can be quite simple, e.g. an initial mixer followed by a holding tank with temperature control means situated in or about the holding tank, or in series therebefore, or a simple pipe or coil reactor immersed in a constant temperature bath.

In the operation back-mixing should be avoided so that no substantial part of the reaction mixture is subjected to reaction conditions longer than we have called for. Unduly prolonged reaction, e.g. above about 120 minutes, greatly increases the risk of substantial polymer formation without significantly adding to ester production. Advantageously the reaction time is maintained between 15 and 90 minutes and preferably between about 30 and 60 minutes. Thus, it can be seen that our process not only will permit a rapid ester production rate with simple equipment of limited size, but it also can tolerate a significant latitude in residence time without deleterious olefin polymerizing effects. This is an important feature in day-in, day-out plant operation where emergency interruptions are likely to occur from time to time.

The temperature of the reaction zone broadly should be between 95° and 160° F., and preferably it is between 130° and 160° F. At temperatures substantially below about 95° F. the reaction is sluggish, and above 160° F. suppression of polymerization is difficult. In the broad temperature range called for, and even more pronouncedly in the preferred temperature range at 130–160° F. the yield of tertiary ester generally exhibits a straight line function with high slope when plotted against residence time, and this slope drops off as reaction times are prolonged substantially beyond the 15–90 minute range.

While batch or continuous extraction of the withdrawn reaction product with water can be practiced in conventional fashion, the preferred extraction technique is a countercurrent liquid-liquid contacting with water entering near the top of a packed or tray type tower and the crude reaction product being fed into the tower near the bottom. Advantageously we have found that we can use as little as one volume part of water to 3 volume parts entering crude ester reaction product (containing sulfuric acid, ester, and unreacted raw materials). While somewhat lower volumetric water ratios, e.g. 1:6, can be used, the 1:3 ratio is preferred for efficiency and economy in the practice of the invention. Of course, even more water can be used, e.g. as much as ½ to 1 or more volume parts of water per volume part of the reactor output, but this dilutes the unreacted carboxylic acid quite a bit, and it makes the recovery of such unreacted acid more complex. The presence of the unreacted hydrocarbon (that is the unreacted isobutylene plus any inert hydrocarbons present), is necessary in our process to create the advantageous partition conditions for reduction of the ester into the raffinate (oily phase) to a very high degree, and the inclusion of the greatly preponderant part of the carboxylic acid and all the sulfuric acid into the aqueous extract phase.

Sulfuric acid in the extract phase can then be neutralized with ammonia, ammonium hydroxide, caustic soda, lime, or calcium acetate, advantageously with the neutralizing material being practically stoichiometric with the sulfuric acid present to form a neutral (normal) sulfate salt. When the thus neutralized aqueous carboxylic acid-neutral sulfate salt solution is concentrated, the salt is precipitated and removed from the concentrate. The carboxylic acid can be worked up into high strength in conventional manner, for example, by extraction and azeotropic distillation using for example, a hydrocarbon or normal butyl acetate or even some tertiary butyl acetate in the recovery treatment. A suitable acetic acid recovery process is disclosed in Vol. 1 of the Kirk-Othmer Encyclopedia of Chemical Technology on page 67. The recovered carboxylic acid can be recycled to the reactor for manufacture of additional ester.

The ester-olefin liquid raffinate phase from the extraction step is separated into unreacted hydrocarbons and ester by conventional means, e.g. distillation. Advantageously, when the hydrocarbons present are mainly or entirely isobutylene, isoamylene, or ones boiling substantially below these, it is simplest to reduce the pressure on the liquid raffinate phase and flash off the hydrocarbons. For advantageous operation the pressure in the reaction zone and in the water extraction zone is maintained at least about 50 p.s.i.g. so that liquid phase conditions can be maintained in both the reactor and the extracting tower.

It is of special advantage to avoid reducing the pressure so much that the vaporized hydrocarbons cannot be condensed with ordinary cooling water available in refineries (e.g. water at a temperature of 60–120° F.). In the situation where the hydrocarbon feed to the reaction zone is virtually pure isobutylene, the condensate from raffinate phase flashing can be condensed and returned directly to the reactor for further production of butyl ester.

Preferably, to insure liquid phase conditions in both the reaction and extraction zones and even when reaction temperatures as high as 160° F. are used and or any substantial fraction of light ends such as propane and the like find their way into the reactor, we prefer to use a pressure of at least about 150 p.s.i.g. when processing isobutylene. In flashing off the liquid raffinate phase in such instance we do not reduce pressure to a value substantially below 20 p.s.i.g. (whereby it would require cooling water or other refrigerant at a temperature substantially below about 60° F. to achieve condensation of the flashed hydrocarbon). Advantageously, we only reduce pressure in the preferred instance down to about 50–75 p.s.i.g.

The materials of construction for our processing equipment are preferably corrosion-resistant, e.g. copper, austenitic stainless steel, glass-lined, impervious graphite or the like.

Referring to the drawing makeup liquid isobutylene, glacial acetic acid and sufficient 66° Bé. sulfuric acid to establish 0.5–2 weight percent sulfuric acid in the resulting reaction mixture in reactor 16 is fed into process by pipe 10. Recovered glacial acetic acid and recovered liquid isobutylene are added thereto by means of lines 12 and 14, respectively. These liquid feeds pass through header 15 continuously. Header 15 can be equipped, if desired, with mixing means (not shown) and with indirect heating means (not shown) to bring the feed temperature into the desired operating range of 95–160° F.

The liquid feeds discharge continuously into reactor 16, a holding tank, equipped if desired with temperature controlling means (not shown), and agitator means (not shown), and are withdrawn continuously from reactor 16 by line 19. This line passes the reactor output continuously into wash tower 20, suitably a packed or tray tower. Tower 20 is fed steadily also with wash water from line 22.

Liquid-liquid scrubbing contact is maintained in tower 20, and an olefin-ester raffinate layer disengages at the top of the tower and an aqueous acid extract phase at the bottom.

The raffinate layer is withdrawn continuously from the tower by line 24 and discharged into flash tower 25 after passing through pressure reducing means (not shown) which cuts pressure to about 50 p.s.i.g. The resulting vapors (mainly hydrocarbon) pass through line 26 and water-cooled indirect heat exchanger 27 wherein they are condensed for recycle to the reaction zone through line 14. The remaining liquid from flashing is withdrawn from the system by means of line 28 as crude tertiary butyl acetate for further separation and refining treatment.

The extract layer is withdrawn continuously from tower 20 by line 29 and passed into an acetic acid recovery system, shown symbolically as item 30 of the drawing. Here the free sulfuric acid is neutralized with ammonia entering line 32 to form ammonium sulfate, and the aqueous acetic acid-ammonium sulfate material worked up in conventional manner, e.g. using azeotropic distillation, rectification, and filtration, the products being reject water, removed by outlet 33, ammonium sulfate by-product, removed by outlet 34, and recovered glacial acetic acid which passes back to the reactor by means of line 12.

The following examples show ways in which our invention has been practiced but they should not be construed as limiting the invention. The equipment used in the operations was as follows: storage of a mixture of glacial acetic acid and sulfuric acid was maintained in one vessel, and thus supplied a feed pump passing the mixture continuously into a copper coil immersed in a thermostatically-controlled water bath. A second storage vessel containing liquid isobutylene at about 60 p.s.i.g. supplied a second feed pump which injected this hydrocarbon continuously into the reactor coil at a junction near the point where the acids entered.

The mixture in the reactor was kept in liquid phase at 150 p.s.i.g. in all exemplary operations. In the first run indicated the reactor output was throttled, and the resulting vapor-liquid mixture was injected into water for scrubbing out acids, collecting a raffinate layer of ester, and separating unreacted isobutylene vapors. In the rest of the runs indicated the water extraction was run under a pressure essentially the same as that maintained in the reactor coil. In these runs the reaction product discharged into an inlet near the base of a vertical stainless steel tubular tower packed with carbon Raschig rings. Water was injected into an inlet near the top of the water extraction vessel to maintain countercurrent water washing of the reactor product. Aqueous extract solution was withdrawn from the bottom of the wash tower and oily liquid raffinate phase from the top. The raffinate phase was free of mineral acid. The withdrawn raffinate phase was reduced in pressure to flash off unreacted hydrocarbon. The yields of ester product and olefin polymer are based on the quantity and analysis of the liquid residue from the flashing of the raffinate. Analyses were made by gas chromatography and mass spectroscopy.

*Example 1.*—In this run the sulfuric acid charge to the reactor amounted to 2 weight percent of the resulting reaction mixture. The mol ratio of isobutylene to acetic acid used was 2:1. The reactor was maintained at 95° F., and the average residence time in the reaction zone through which the reactants were continuously passed was 30 minutes. Onstream operation was maintained for 28 hours. The molal yield of tertiary acetate based on acetic acid fed was 46%; expressed otherwise the yield was 80 pounds per barrel of feed. The yield of isobutylene dimer was only 1.3 pounds per barrel of feed.

*Example 2.*—The runs shown in this example and all the rest following were made with water washing under pressure as hereinbefore described.

The following sets of runs are contrasted to show the importance of maintaining catalyst concentration within the range called for. In the first run, at 130° F. reactor temperature using a sulfuric acid concentration of 2 weight percent, a mol ratio of isobutylene to glacial acetic acid of 2:1 and an average residence time of one-half hour, there was yielded 50.7 mol percent of tertiary butyl acetate based on the acetic acid fed, or 87.7 pounds of tertiary butyl acetate per barrel of feed. The isobutylene polymer (dimer) yield only amounted to 1.6 pounds per barrel of feed. The operation was maintained onstream for 40 hours.

In contrast to this, other operations wherein the conditions were maintained the same except that 5% sulfuric acid was used instead and the onstream operating time was 56 hours, the yield was only slightly higher, namely 55 mol percent tertiary butyl acetate or 98.3 pounds per barrel of feed, but the isobutylene polymer (dimer) amounted to 9.9 pounds per barrel of feed.

*Example 3.*—In a further run with an isobutylene-acetic acid mol ratio of 2:1, average residence time for reactants in the reactor of 15 minutes, a reactor temperature was 160° F., and 2% by weight sulfuric acid based on the weight of the feed to the reactor, the tertiary butyl acetate molal yield was 46.4 percent based on acetic acid charged to the reactor (or 85.0 pounds of this ester per barrel of feed). The isobutylene polymer yield was only 2.1 pounds per barrel of feed.

A like run was made, except that the residence time was one hour instead of 15 minutes. The molal yield of tertiary butyl acetate was 49.6% based on acetic acid fed, or 88.1 pounds of the tertiary ester per barrel of feed. That the isobutylene polymer (dimer) yield was only 2.3 pounds per barrel of feed shows the comparative flexibility of our process with respect to reaction time when our combination of reaction controls is maintained. Onstream production was maintained for 40 hours in both these runs.

*Example 4.*—A series of check runs were made to ascertain the reproducibility of the good results obtained by the practice of the instant invention. These runs were operated at a 160° F. reactor temperature with a residence time of one hour in the reactor, a sulfuric acid concentration of 0.5 weight percent in the reaction mixture, and a mol ratio of isobutylene to glacial acetic acid of 2:1. The onstream time of each run was 20 hours. In the first of such runs, the molal yield of tertiary butyl acetate based on acetic acid was 29.2 mol percent, amounting to a tertiary butyl acetate yield of 61.5 pounds per barrel of feed; the second, the molal yield was 35.1 percent, amounting to a tertiary butyl acetate yield of 69.8 pounds per barrel of feed; in the third, the yield was 30.2 mol percent, amounting to a tertiary butyl acetate yield of 55.7 pounds per barrel of feed; in the fourth the molal yield was 30.6 percent, amounting to a tertiary butyl acetate yield of 55.6 pounds per barrel of feed; and in the fifth run the molal yield of ester was 30.9 percent, amounting to a tertiary butyl acetate yield of 55.8 pounds per barrel of feed. The isobutylene polymer yield in each run was only to 0.3 pound per barrel of feed.

We claim:

1. In a process for condensing a tertiary olefin containing 4–5 carbon atoms with an aliphatic hydrocarbyl monocarboxylic acid containing 2–3 carbon atoms in the presence of sulfuric acid to form the corresponding tertiary alkyl ester of said carboxylic acid, the improvement which comprises: forming a homogenous liquid phase reaction mixture containing about 0.5–2.5 weight percent of sulfuric acid and 1.5–2.5 mols of said tertiary olefin per mol of said carboxylic acid, continuously passing said reaction mixture into a reaction zone, maintaining temperature of said reaction mixture in said reaction zone between 95° and 160° F., maintaining pressure in said reaction zone sufficiently high for holding the reaction mixture in the liquid phase, maintaining average residence time of said reaction mixture in said reaction zone between about 15 and about 120 minutes, continuously withdrawing crude liquid phase reaction product containing the tertiary ester from said reaction zone, extracting with liquid water in an extraction zone sulfuric acid and free carboxylic acid from said crude liquid phase reaction product, separating resulting ester-olefin liquid raffinate phase containing tertiary alkyl ester product from resulting carboxylic acid-rich aqueous liquid extract phase, recovering carboxylic acid from said extract phase, and separating tertiary olefin from said raffinate phase containing the tertiary alkyl ester of said carboxylic acid.

2. In a process for condensing isobutylene with acetic acid in the presence of sulfuric acid to form tertiary butyl acetate, the improvement which comprises: forming a homogeneous liquid phase reaction mixture containing about 0.5–2 weight percent of sulfuric acid and 1.5–2.5 mols of isobutylene per mol of acetic acid, continuously passing said reaction mixture into a reaction zone, maintaining temperature of said reaction mixture in said reaction zone between 95° and 160° F., maintaining pressure in said reaction zone sufficiently high for holding the reaction mixture in the liquid phase, maintaining average residence time of said reaction mixture in said reaction zone between about 15 and about 90 minutes, continuously withdrawing crude liquid phase reaction product containing tertiary butyl acetate from said reaction zone, extracting with liquid water in an extraction zone sulfuric acid and free acetic acid from said withdrawn crude liquid phase reaction product, separating resulting ester-olefin raffinate phase containing tertiary butyl acetate from resulting acetic acid-rich aqueous liquid extract phase, recovering acetic acid from said extract phase, and separating isobutylene from said raffinate phase containing tertiary butyl acetate.

3. The process of claim 2 wherein pressures in said reaction and said extraction zones are at least about 50 p.s.i.g., and isobutylene is separated from said separated liquid raffinate phase by reducing pressure, condensing separated isobutylene vapor, and returning the resulting isobutylene condensate to said reaction zone.

4. The process of claim 3 wherein the pressures in said reaction and said extraction zones are at least about 150 p.s.i.g., and isobutylene separated from said raffinate phase at a pressure not substantially below about 20 p.s.i.g.

5. The process of claim 2 wherein the temperature of said reaction mixture in said reaction zone is 130–160° F., the residence time of said reaction mixture in said esterification zone is 30–60 minutes, and the mol ratio of isobutylene to acetic acid in the reaction mixture passed into said esterification zone is about 2:1.

6. The process of claim 2 wherein sulfuric acid in said extract phase is converted into a neutral sulfate salt, said extract phase is concentrated, then separated from neutral sulfate salt and returned substantially salt-free to said reaction zone.

7. The process of claim 2 wherein sulfuric acid in said extract phase is converted to ammonium sulfate, said extract phase is concentrated, with resulting precipitation of ammonium sulfate, separating said precipitated ammonium sulfate and returning substantially salt-free extract phase to said reaction zone.

References Cited in the file of this patent

UNITED STATES PATENTS

| | | |
|---|---|---|
| 1,877,291 | Frolich et al. | Sept. 13, 1932 |
| 2,041,193 | Lee | May 19, 1936 |

OTHER REFERENCES

Evans et al.: Ind. Eng. Chem. 30, 55–58 (1938).
Houben-Weyl.: "Methoden der Organischen Chemie," "Sauerstoffverbindungen III," 1952, pages 534–535.